United States Patent [19]

Tomita et al.

[11] Patent Number: 4,486,810
[45] Date of Patent: Dec. 4, 1984

[54] ELECTRODE LEAD TAB FOR CAPACITOR

[75] Inventors: Eihachiro Tomita, Tokyo; Mitsuru Ota, Iwaki, both of Japan

[73] Assignees: Kureha Kagaku Kogyo Kabushiki Kaisha, Nihonbashi; Radio Research & Technical Incorporated, Tokyo, both of Japan

[21] Appl. No.: 530,611

[22] Filed: Aug. 30, 1983

Related U.S. Application Data

[63] Continuation of Ser. No. 221,069, Dec. 29, 1980, abandoned.

[30] Foreign Application Priority Data

Jan. 10, 1980 [JP] Japan .................................. 55-1687

[51] Int. Cl.³ .......................... H01G 1/14; H01R 3/00
[52] U.S. Cl. ................................ 361/306; 339/278 R
[58] Field of Search ................ 361/306, 307, 308; 339/95 R, 278

[56] References Cited

U.S. PATENT DOCUMENTS

| | | | |
|---|---|---|---|
| 2,156,099 | 4/1939 | Scheppmann | 361/306 X |
| 2,445,587 | 7/1948 | Sims | 361/306 X |
| 2,615,946 | 10/1952 | Katzman | 361/307 |
| 2,665,400 | 1/1954 | Walker | 317/258 |
| 2,735,970 | 2/1956 | Peck et al. | 137/258 |
| 2,951,002 | 8/1960 | Ruscito | 154/80 |
| 3,320,566 | 5/1967 | Lohman | 361/307 X |
| 3,398,339 | 8/1968 | Pierpont et al. | 361/307 |
| 3,596,147 | 7/1971 | Zeppieri | 317/230 |

FOREIGN PATENT DOCUMENTS

| | | |
|---|---|---|
| 315023 | 10/1919 | Fed. Rep. of Germany . |
| 2827469 | 1/1980 | Fed. Rep. of Germany . |
| 504452 | 4/1939 | United Kingdom . |
| 768422 | 2/1957 | United Kingdom . |
| 866542 | 4/1961 | United Kingdom ................ 361/308 |

Primary Examiner—Donald A. Griffin
Attorney, Agent, or Firm—Wegner & Bretschneider

[57] ABSTRACT

An electrode lead tab for oil-impregnated capacitors having dielectric sheets and electrode foils laminated to each other, in which a plurality of cutting lines or rifts are provided to a tab main body, so that the tab main body can ensure a close electrical contact at a plurality of regions thereof to the electrode foils.

16 Claims, 14 Drawing Figures

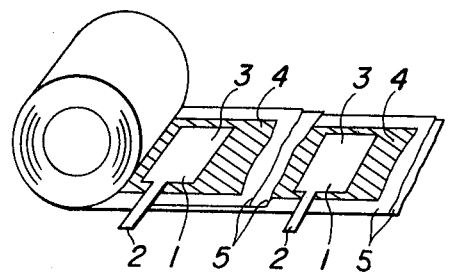
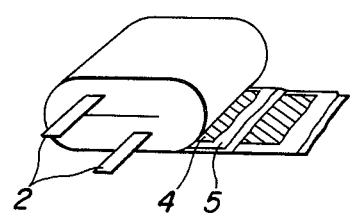
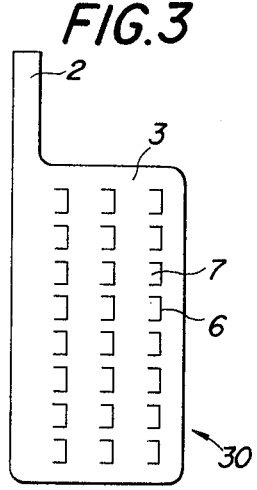
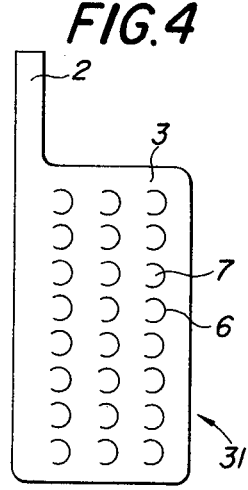
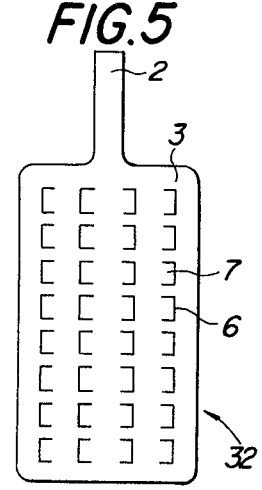
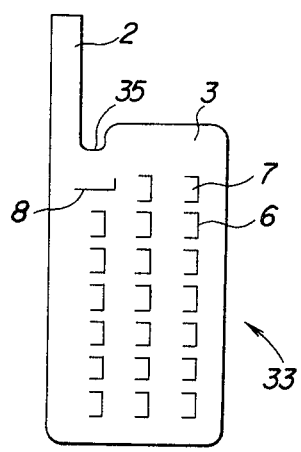
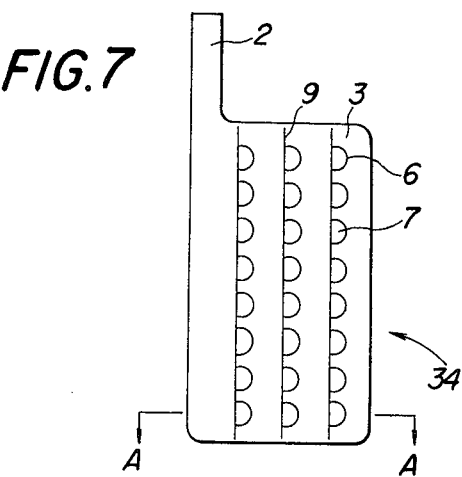

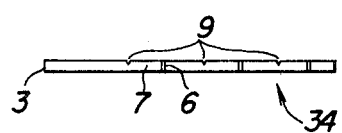
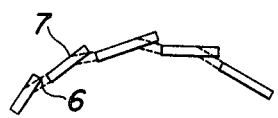
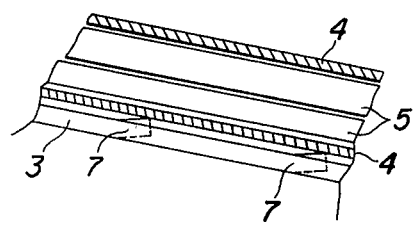
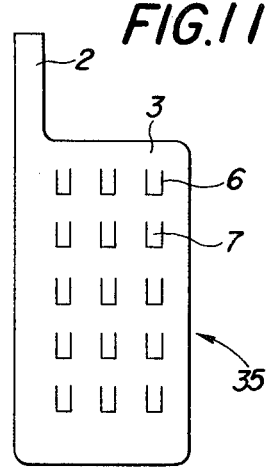
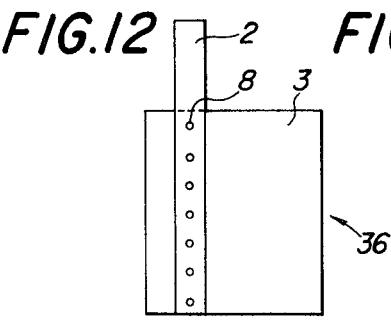
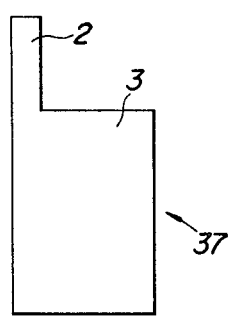

ELECTRODE LEAD TAB FOR CAPACITOR

This application is a continuation of U.S. application Ser. No. 221,069 filed Dec. 29, 1980 now abandoned.

This invention concerns an electrode lead tab for capacitors having dielectric sheets and electrode foils such as aluminum foils laminated to each other or wound together.

Usual high voltage capacitors include those having insulating paper or insulating paper and plastic film as dielectric material and aluminum foil in a laminated structure, and at least a pair of electrode lead tabs in a suitable configuration to contact the opposing electrodes respectively, or further those having plastic films and electrodes laminated together. Generally, such capacitors have been manufactured by laminating the above dielectric sheets and electrode foils with width narrower than that of the dielectric sheets and winding them together, interposing at least a pair of electrode lead tabs in a suitable configuration to contact with the opposing electrodes respectively during the winding step to thereby form a capacitor element, then housing the thus formed capacitor element into a container generally made of a metallic casing or the like and, thereafter, impregnating insulation oil under vacuum.

As the electrode lead tabs for such capacitors, there have been employed those made of a metal foil with thickness equal to or larger than that of the electrode foil and cut into a certain shape, for example, a ribbon-like copper foil plated with tin or a ribbon-like copper foil welded to an aluminum foil with width larger than that of the copper foil.

Since the electrode lead tabs of this type are over-laid on the electrode foils respectively and wound as they are together with the dielectric sheets and the electrode foils in the winding step for the capacitor element, electrical connection between the lead tabs and the electrode foils is dependent on mechanical and electrostatic forces.

It is, accordingly, considered that the electrode foil and the lead tab make point-to-point contact only locally, which fails to ensure a close electrical contact. Thus, although the lead tab over-laid on and wound together with the electrode foil in the winding step may, initially, contact the electrode foil substantially in a plane contact, when insulation oil sufficiently penetrates to the inside of the insulation paper or between the dielectric sheets and to the interface between them and the electrode foil in the subsequent impregnation step for the capacitor element, the insulation oil also penetrates nearly in the state of a single molecule membrane into the contact area at the interface between the electrode foil and the lead tab. As the result, since the gap between the electrode foil and the lead tab that has been kept so far nearly in the line or plane contact is enlarged by the intrusion and presence of the insulation oil, the contact between the electrode foil and the lead tab is now kept only in the extremely restricted area, for example, at the periphery of the tab where the intense contact is maintained in the point-to point contact or line contact.

If a high voltage is applied across both of the lead tabs of the capacitor causing a large current to flow between them in such a state of contact, since the contact between the lead tabs and the electrode foils is insufficient, the high voltage and thus the large current are concentrated to restricted areas of contact which, results in great amount of heat locally in the electrode foils and may fuse them. Further, such heat promotes the degradation in the insulation paper and the plastic film and, in worse cases, may result in insulation destruction in the dielectric sheet.

In order to ensure a close electrical contact between the electrode foil and the lead tab, a method of spot-welding the electrode foil and the lead tab or a method of appending them together by means of conductive adhesives (or paints) has been proposed. However, the former welding method brings about difficulty in the workability in the case where the thickness of the electrode foils is small and is also disadvantageous in that undesirable projections are formed in the periphery of the welded area which tends to result in the reduction of the capacitor withstand voltage. In the latter method, the conductive adhesive may lead out into the impregnated insulation oil tending to reduce the insulation performance of the capacitor.

Accordingly, it is an object of this invention to provide an electrode lead tab for an oil-impregnated capacitor having dielectric sheets and electrode foils laminated together, which is capable of eliminating the destructive failures of the capacitor due to defective contact caused by the incomplete contacting function of the electrode lead tab and is also suitable to the usual capacitor winding work. The feature of the electrode lead tab according to this invention resides in that close contact is ensured between most parts of the region in the tab main body and the electrode even when the insulation oil is impregnated, by providing a plurality of cutting lines or rifts in the tab main body. More specifically, the electrode lead tab according to this invention is over-laid on the electrode foil as the metal foil terminal, for example, aluminum foil, copper foil, tin plated copper foil or the likes (usually in 20–200 $\mu$m of the foil thickness), and regions of small movable chips are formed at a plurality of positions in the tab main body of the electrode lead tab in contact with the electrode foil, in which most parts of the periphery of the regions are cut off from the tab main body while leaving other remaining part contacted with the tab main body so that the movable chip is bendable relative to the tab main body.

Since each of the plurality of small movable chips whose periphery is cut off, in most parts, from the tab main body by cutting, for example, in U-shape or curved shape can be moved relative to the entire surface of the tab main body independently from each other, each of the small movable chips can make a contact with the electrode foils independently from the tab main body. Further, even if the contact area between the small movable chips and the electrode foil is decreased by the intrusion of the insulation oil, the most intense contact area in each of the small movable chips is left as it is. Consequently, a large number of small movable chips thus formed in the tab main body, increase the contact area between the electrode lead tabs and the electrode foils correspondingly thereby enabling to eliminate the destructive failures in the capacitor due to insufficient contact.

This invention is to be explained in more details by way of preferred embodiments.

FIG. 1 and FIG. 2 are perspective views for the wound state of usual wound capacitors;

FIG. 3 to FIG. 7 are explanatory views for the structure of the respective embodiments of the electrode lead tab according to this invention;

FIG. 8 is a vertical cross sectional view of the electrode lead tab taken along in A—A in FIG. 7;

FIG. 9 is an explanatory view for the cross section of a part of the capacitor which shows the bended state of the electrode lead tab according to this invention in the wound capacitor;

FIG. 10 is an explanatory view for a part of the electrode lead tab according to this invention showing it in use substantially in a planar state in a laminated capacitor;

FIG. 11 is a view showing another embodiment of the electrode lead tab according to this invention; and FIG. 12 and FIG. 13 are plan views of the usual electrode lead tabs.

Figure 14:
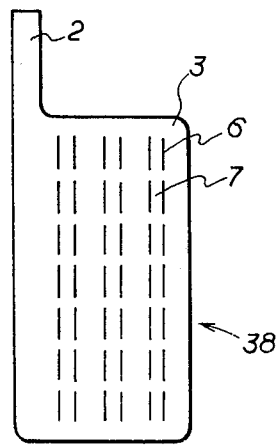
FIG. 14 is a view showing another embodiment of the electrode lead tab according to this invention.

FIG. 1 and FIG. 2 show a wound capacitor element using electrode lead tabs 1. The electrode lead tab 1 consisting of a terminal strap or lead portion 2 and a tab main body 3 with enlarged surface of the terminal strap 2 is over-laid on an electrode foil 4 and wound together with a dielectric sheet 5 (insulation paper or plastic film) to constitute a capacitor element.

FIG. 3 and FIG. 4 show electrode lead tabs 30 and 31 according to this invention for use with such a capacitor element. The lead tab 30 has a shape similar to that shown in FIG. 1 and consists of a ribbon-like terminal strap 2 and a tab main body 3 made of an aluminum foil and with width larger than that of the terminal strap 2 integrated to each other. A plurality of linear cutting lines or rifts 6 are slotted either in U-shape or a curved shape in the tab main body in contact with the electrode foil 4 and each of the regions surrounded with the U-shape or the curved shape cutting line or rift is cut off from the tab main body 3 while partially leaving its periphery so that each of the regions forms a small movable chip 7 which is freely bendable relative to the tab main body 3.

The configuration of the linear cutting line or rift 6 may be of a semi-circle or of an arc in addition to that shown in the drawings, and the arrangement and the direction of the regions defined by these linear cutting lines or rifts 6 may be adequately determined depending on the state of the capacitor element in use. In the case of the electrode lead tab inserted into the curved portion of the capacitor element consisting of laminated dielectric sheets and electrode foils wound together as shown in FIG. 1 and FIG. 2, it is preferred to form the linear cutting line or rift 6 such that the small movable chips 7 can be bent substantially in perpendicular to the longitudinal direction of the terminal strap 2. Although the linear cutting line or rift may be of a linear configuration with no substantial width formed by merely being cut, for example, with a knife, it is preferred to provide the cutting lines or rifts with a small width by way of chemical etching or the like since the small movable chips can be moved with no hinderance from the tab main body. It is further desired that the cutting line or rift 6 has a width of the dimension larger than the dimension of thickness of the tab main body.

A lead tab 32 shown in FIG. 5, has a lead portion 2 integrated to the middle of a tab main body 3 and is provided, on the right and left sides respectively of the longitudinal direction of the lead portion 2, with groups of small movable chips 7 each having a U-shaped cutting line or rift whose direction is in perpendicular to the longitudinal direction and opposed to each other between the group on the right and the group on the left. This structure ensures closed contact between the small movable chip groups and the electorde foils when used in the acutely curved portion, for example, in the wound capacitor element. Further, since the lead portion situates at the middle of the tab main body, distortion and tension in the terminal strap are uniformly dispersed over the entire portion of the tab main body enabling to reduce these effects on the lead tabs.

In an embodiment shown in FIG. 6, a recess 35 intruding deeply into the tab main body is formed at or near the base portion of the lead portion 2 relative to the tab main body 3. In this embodiment, the effects such as "creases" or the likes on the tab main body resulted when the terminal strap 2 is connected with electrode wirings (not shown) may be reduced. A further cutting line 8 other than the small movable chips 7 may also be provided near the base end of the terminal strap 2 in the lead tab 33. Since the cutting line 8 can prevent the formation of creases or the likes due to the stretching for the entire portion of the tab when the lead portion 2 is connected with electrode wirings (not shown), the stress applied to the lead portion 2 can be interrupted at this line 8 and prevented from propagating into the tab main body 3.

In an embodiment shown in FIG. 7, fine grooves 9 are formed in the lead tab 34 along the longitudinal direction of the terminal strap 2 and in contact with the end of the cutting line 6 for the small movable chips 7, which facilitate the impregnation of the insulation oil into the electrode lead tab in the laminated capacitor and further facilitate the bending of the small movable chips 7 relative to the tab main body.

FIG. 8 shows a vertical cross section of the electrode lead tab taken along line A—A in FIG. 7.

In the electrode lead tab shown in the above embodiment, the small movable chips 7 are aparted from the tab main body 3 peeled therefrom to the electrode foil as shown in FIG. 9 when the lead tab is bent upon winding step and the tab contacts the electrode foil at individual small movable chips. Also, as shown in FIG. 10, the small movable chips 7 formed in the tab main body 3 are bent relative to the electrode foil 4 in contact with the dielectric sheet 5 and come to contact with the electrode foil. In the case of a tab to be used for the portion nearly in a planar state, small movable chips 7 having U-shaped cutting line arranged in the direction in parallel with the longitudinal direction of the lead portion 2 can be formed as shown by lead tab 35 in FIG. 11.

The small movable chips 7 are bent of themselves to contact the electrode foil as shown in FIG. 9 in the case where the tab main body is used in the state intensely curved entirely. However, in the case where the tab main body is used nearly in the planar state, the small movable chips 7 may previously be bent or turned back in one intended direction so as to contact the electrode 4 as shown in FIG. 10. In the case where the small movable chips are previously bent or turned back in one intended direction, since they naturally define the front and rear faces to the lead tab, the lead tab has always to be inserted with the side from which the small movable chips 7 are projected being contacted to the electrode foil 4. If it is wanted to avoid such troubles for the confirmation of its front and rear surfaces, the bending or turning direction of the small movable chips 7 may be made different alternately on every chip or between the group of the chips. For instance, in the lead tab as shown in FIG. 5, the group of small movable chips situated on the right of the extending line for the lead portion 2 may be bent upwardly and, while on the other hand, those on the right of the extending line may be bent downwardly. Satisfactory contact can then be obtained between the electrode foil and the small movable chips when any of the surfaces of the lead tab contact the lead foils.

Alternatively, as shown in FIG. 14, the main body 3 of lead tab 38 may be provided with a plurality of regions 7 defined by pairs of cutting lines or rifts 6 which are located opposite each other with a constant distance, so that the contact area between the electorde lead tab of this invention and the electrode foil can be increased as compared with the case in which a single electrode lead tab is applied.

Comparison will now be made between the foregoing electrode lead tab according to this invention and the electrode lead tabs 36 and 37 employed conventionally shown in FIG. 12 and FIG. 13. In the conventional electrode lead tab 36, a lead portion 2 made of a ribbon-like foil and a tab main body 3 made of aluminum and with a larger width are welded to each other at several positions 8 by way of spot welding. The electrode lead tab 37 consists of the tab main body 3 and the lead portion 2 integrated to each other punched from a thin copper foil. Consequently, when such electrode lead tabs are used in wound capacitor elements or laminated capacitor elements prepared from the dielectric sheets and the electrode foils, the electrode foil and the tab main body tend to contact only at extremely restricted portions in point-to-point contact or line contact. While on the other hand, according to this invention, since a plurality of small movable chips are provided in a contactable manner to the tab main body, close contact is kept between the electrode foil and most parts of the area of the tab main body within the capacitor element, thereby enabling to eliminate destructive failures in the capacitor often resulted so far due to insufficient contact between the tab main body and the electrode foil and to manufacture highly reliable capacitors.

What is claimed is:

1. An oil-impregnated winding-type capacitor, comprising:
   a first dielectric sheet;
   a first electrode foil laminated to the first dielectric sheet;
   a second dielectric sheet laminated to the first electrode foil;
   a second electrode foil laminated to the second dielectric sheet; and
   a pair of electrode lead tabs, each of the electrode lead tabs being respectively disposed on one of the electrode foils, wherein the dielectric sheets, electrode foils and the pair of electrode lead tabs are all wound up to form the capacitor, each electrode lead tab having a filmy flexible tab main body to be in contact with the electrode foil and a terminal strap being integrally formed with the tab main body and extending generally perpendicular to the winding direction of the capacitor, the tab main body having a plurality of rifts, which form small movable chips being defined by round U-shaped cut lines.

2. The electrode lead tab of claim 1, wherein each of the rifts includes at least a portion of a cut line extending generally perpendicular to the winding direction of the capacitor and the rifts are arranged in rows generally perpendicular direction to the winding direction of the capacitor.

3. The capacitor of claim 2, wherein the U-shaped cut lines are angular.

4. The electrode lead tab of claim 2, wherein the rifts comprise a plurality of pairs of short cut lines arranged in rows generally perpendicular to the winding direction of the capacitor, each pair of short cut lines being located opposite each other a constant distance apart.

5. The capacitor of claim 1, wherein the U-shaped cut lines are round and the rifts are arranged in rows generally perpendicular to the winding direction of the capacitor.

6. The electrode lead tab of claim 5, wherein the small movable chips are defined by round U-shaped cut lines which are general circular arcs, each of the general circular arcs having a central angle of more than 180°.

7. The electrode lead tab of claim 3 or 6, wherein the small movable chips are all oriented in the same direction.

8. The electrode lead tab of claim 2, wherein the small movable chips are oriented in the same direction as the winding direction of the capacitor.

9. The electrode lead tab of claim 3 or 6, wherein the small movable chips comprise two groups of chips divided by a center line on the tab main body generally perpendicular to the winding direction of the capacitor, the free end of each small movable chip of one group being oriented to the opposite direction from the free end of each small movable chip of the other group.

10. The electrode lead tab of claim 3 or 6, wherein each cut line of the small movable chips has a width larger than the thickness of the tab main body.

11. The electrode lead tab of claim 3 or 6, wherein guide grooves for insulating oil are provided on the tab main body extending generally perpendicular to the winding direction of the capacitor and on the bending line of each of the small movable chips arranged in rows.

12. The electrode lead tab of claim 3 or 6, wherein the bending direction of the small movable chips in the tab main body is parallel to the winding direction of the capacitor.

13. The electrode lead tab of claim 3 or 6, wherein the small movable chips comprise two groups divided by a center line generally perpendicular to the winding direction of the capacitor on the tab main body, the free end of each small movable chip of one group being oriented in a different direction from the free end of each small movable chip of the other group.

14. An electrode lead tab of claim 1, 2, 3, or 6 wherein the electrode lead tab is for a capacitor wound in the shape of cylinder.

15. An electrode lead tab of claim 1, 2, 3, 5, or 6 wherein the electrode lead tab is for a capacitor wound in the shape of a substantially flat ellipse.

16. The electrode lead tab of claim 1, wherein a cut line is provided on a portion of the tab main body adjacent to the terminal strap so as to interrupt the propagation of stress into the tab main body.

* * * * *